United States Patent [19]
Schutten

[11] Patent Number: 5,821,630
[45] Date of Patent: Oct. 13, 1998

[54] FLYWHEEL-SPEED SENSING FOR CONTROL OF AN EMERGENCY-POWER ENGINE

[76] Inventor: Herman P. Schutten, 8545 N. Fielding Rd., Milwaukee, Wis. 53217

[21] Appl. No.: 555,873

[22] Filed: Nov. 13, 1995

[51] Int. Cl.$^6$ .............................. F02N 11/08; F02D 29/06
[52] U.S. Cl. ..................... 290/30 R; 290/4 D; 290/40 A
[58] Field of Search ................................ 290/30 R, 30 B, 290/4 R, 4 C, 4 D, 40 A, 40 B, 40 C; 322/4

[56] References Cited

U.S. PATENT DOCUMENTS

| | | | |
|---|---|---|---|
| 3,558,901 | 1/1971 | Jacobus | 290/30 R |
| 3,675,112 | 7/1972 | Smith | 290/4 R |
| 4,433,547 | 2/1984 | Firey | 60/711 |
| 4,439,720 | 3/1984 | Georges | 322/4 |
| 4,580,402 | 4/1986 | Firey | 60/711 |
| 4,857,755 | 8/1989 | Comstock | 307/47 |

*Primary Examiner*—Steven L. Stephan
*Assistant Examiner*—Christopher Cuneo
*Attorney, Agent, or Firm*—Charles H. Grace

[57] ABSTRACT

A system and controller for providing emergency power to an electrical load when a usual source of power for the load has failed, includes an electrical dynamo, an engine of controllable speed connectable by clutch to drive by a fixed speed ratio the dynamo, a continuously spinning flywheel to provide power while the engine is coming up to speed and during transient loads thereafter, and a control system. The flywheel is also connected with the dynamo, through a variable-speed transmission. When the engine is driving the dynamo, the speed of the engine is controlled by a loop, which involves sensing the torque of the flywheel, comparing the flywheel's speed with a first reference, and adjusting the throttle according to the difference. Simultaneously, the speed ratio of the variable transmission is controlled by a second loop, which involves sensing the output frequency of the dynamo, comparing it with a second reference to get a difference signal, and adjusting the transmission's ratio in accordance with the difference signal. For short interruptions of the usual power source, the flywheel provides emergency power and the engine is not started.

9 Claims, 1 Drawing Sheet

FLYWHEEL-SPEED SENSING FOR CONTROL OF AN EMERGENCY-POWER ENGINE

FIELD OF THE INVENTION

The invention relates to power systems and especially emergency power systems for temporary use when a normal source of power such as an electrical utility power line fails.

BACKGROUND OF THE INVENTION

Some electrical systems such as computers can be severely disrupted if their supply of electrical power is interrupted for even a few seconds. Emergency power supplies are in common use, in which a standby internal-combustion engine is automatically started promptly upon failure of the utility power line. The standby engine drives an AC electric dynamo, which supplies electrical power to the load until normal power is restored.

After the utility power fails the internal-combustion engine requires a few seconds to start and to accelerate to a speed fast enough to drive the dynamo to produce the desired electrical output frequency. Thus there is a delay, which could result in a harmful interruption of power to the load if the delay were not bridged.

To bridge the delay upon utility power failure, a flywheel has been used in typical prior art to drive the electrical dynamo until the internal-combustion engine has been brought up to speed. The dynamo is usually a synchronous machine that can operate as a generator or a motor. Acting as a motor, the dynamo keeps the flywheel spinning when the utility power is normal, so the flywheel is ready to drive the emergency dynamo as a generator immediately upon a utility power failure.

During a utility power outage and before the engine takes over the load, the flywheel sends energy to the dynamo, so the speed of the flywheel gradually diminishes. The flywheel alone cannot therefore drive the dynamo at a constant speed. A variable hydraulic transmission, connected mechanically between the flywheel and the dynamo, has been used in the prior art to keep the speed constant at which the dynamo is driven by the flywheel.

The hydraulic transmission converts the varying speed of the flywheel to a desired constant speed at the dynamo's shaft. To accomplish this, a signal from a frequency sensor at the dynamo's output is input to a controller, which is part of a closed loop. This loop controls the speed ratio of the variable-ratio hydraulic transmission.

In the typical prior art, after the engine has come up to full speed and has been connected by a clutch to the dynamo, the speed of the engine is maintained constant by another closed control loop, which may be a governor that constantly compares the instantaneous speed of the engine with a preset reference, and adjusts the throttle.

One disadvantage of the prior art system just described is that while the engine is driving the dynamo, both the closed loop that regulates the hydraulic transmission's ratio and the closed loop that regulates the engine's speed are controlled by sensing the actual speed (usually the electrical frequency) of the dynamo. The speed of the engine, which is connected by the clutch with the dynamo at that time, is therefore controlled in accordance with the same quantity as that which controls the flywheel, namely the frequency of the dynamo. Two conflicting control loops having the same sensed input and same torque output location try to control the system. The simplest solution to this problem is to disable the hydraulic control loop when the engine is coupled to and controlling the dynamo.

SUMMARY OF THE INVENTION

The invention is used primarily when the normal utility power has failed, the engine is driving the dynamo, and the flywheel is also connected with the dynamo, via the transmission. The invention has most of the basic components of the prior-art system described above, except that the speed of the engine is controlled by sensing the speed of the flywheel instead of the frequency of the dynamo. The speed of the flywheel is sensed in order to control the torque supplied by the engine (through the clutch) to the dynamo. Of course when the engine is accelerated it provides more torque to the dynamo.

With the invention, loosely speaking, the "output power locations" of the two control loops are still the same, namely the shaft of the dynamo. But the "sensed quantities" that control the two loops are different. For control of the engine the sensed quantity is the speed of the flywheel, while for control of the hydraulic transmission it is the dynamo's output frequency.

Thus the speed of the flywheel controls the torque provided by the engine, while the variable transmission is controlled by sensing the frequency of the dynamo.

The invented arrangement has some important advantages.

A PREFERRED EMBODIMENT

Major Components and Their Interconnections

Figure 1:
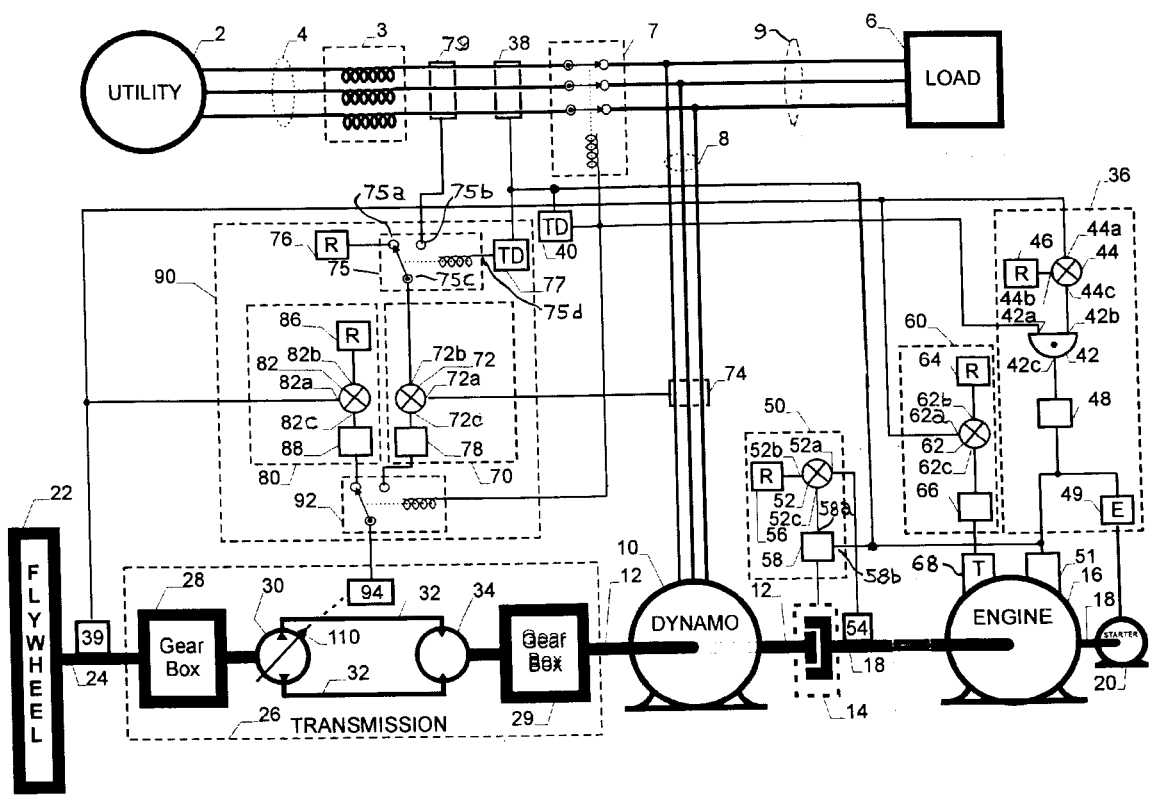
FIG. 1, the sole FIGURE, is a block diagram of a preferred embodiment of the invention.

The major components and interconnections of the preferred embodiment are described first, with reference to FIG. 1.

Power Lines and Dynamo

A utility AC power source 2 is connected to supply power under normal conditions through a set of power lines 4, interruption means 7, and power lines 9, to an electrical load 6. A series-connected element 3 in the lines 4 in FIG. 1 represents existing power-line source impedance and if necessary, added impedance to prevent the system from attempting to supply power to a source short circuit during a fault prior to opening of the interruption means 7.

A set of emergency power lines 8 is connected to the normal load power lines 9, and to the output terminals of a conventional polyphase dynamo 10. (Routine design means for disconnecting the dynamo power lines 8 from the load power lines 9 for maintenance, etc. are not shown). The dynamo 10, which is for emergency use, has a main shaft 12 extending in opposite directions from its rotor.

Engine, Starter and Clutch

One end of the dynamo shaft 12 is connected to one plate of a conventional clutch 14, whose other plate is connected to a first end of a shaft 18 of a conventional internal combustion engine 16. The opposite end of the engine shaft 18 is connected to a conventional (for example, a battery-powered) starter motor 20. The starter motor has the usual mechanical disconnection device to enable it to stop driving the engine when the engine has started to run under its own power.

Flywheel and Transmission

A conventional flywheel 22 has a shaft 24 that is connected to a variable transmission 26, shown in FIG. 1 as a dashed-line box. Within the transmission 26 is a conventional gear box 28, which is connected mechanically to a variable-displacement hydraulic device 30 that can operate as either a pump or a motor. The variable device 30 is connected via hydraulic lines 32 to a fixed-displacement hydraulic device 34, which also can operate as either a pump or a motor. The mechanical shaft of the device 34 is connected to a conventional gear box 29, which is then connected to the shaft 12 of the dynamo 10.

Starter Actuation Circuit

A starter actuation circuit 36 receives one of its input signals from a prior-art line-power-condition sensor 38 (via time delay device 40), which detects the condition of the electrical power line 4 and produces a power-line-condition signal when the utility power falters or fails. Upon a utility power failure, the power-line-condition signal is conducted into a time delay device 40, which, after a predetermined (short) delay, transmits the failure signal to the source disconnect device 7 and to terminal 42a of an AND gate 42 of starter actuation circuit 36.

Another input signal to the starter actuation circuit 36 is a flywheel-speed signal that originates in a tachometer 39 at the flywheel shaft 24. The tachometer 39 measures the speed of the flywheel 22. The flywheel-speed signal is input to a terminal 44a of a comparator 44, which has another input, at 44b, from a flywheel-speed-reference module 46. An error signal that indicates that the flywheel speed is above or below the speed reference value is connected from an output terminal 44c of the comparator 44 to a second input 42b of the AND-gate 42.

Connection is provided from an output terminal 42c of the AND-gate 42, to a conventional starting circuit 48 that is able to switch an energy source 49 the starter motor 20. The output of the circuit 48 is also connected to a latching circuit 51 for providing electrical control power to the internal-combustion engine 16.

Clutch-Control Circuit

A clutch-control circuit 50 comprises a comparator 52 that has two inputs, 52a and 52b, and an output terminal 52c. A signal is received at input 52a from a tachometer 54, which is at the shaft 18 of the engine 16. The tachometer 54 measures the speed of the engine. A speed reference signal, obtained preferably from a reference module 56 (or, alternatively, from a dynamo frequency sensor 74), is connected to the input terminal 52b.

The output terminal 52c has a signal that depends upon the difference between the engine speed and the speed reference 56. This difference signal is conducted to a terminal 58a of a clutch actuator 58, which actuates the clutch 14 upon receipt of an appropriate difference signal from terminal 52c.

The sensing device 38, which produces an alarm signal when the utility power fails, is connected to a terminal 58b of the clutch actuator 58 to prevent the clutch actuator from engaging the clutch when the utility power is normal. Using an AND-gate, not shown, the signal from device 38 enables the clutch actuator to engage the clutch when the utility power fails, provided that the signal at terminal 52c also calls for clutch engagement. Once engaged, the clutch remains engaged (latches) until commanded to open.

Engine Speed Control Circuit

To regulate the engine's speed, a first closed-loop controller 60 is provided. It includes a comparator 62, which has two input terminals 62a and 62b, and an output terminal 62c. The input terminal 62a receives a speed signal from the flywheel-speed tachometer 39. The terminal 62b receives a speed-reference signal from a reference module 64.

From the output terminal 62c an error signal (i.e., a difference signal) is conducted to a throttle-actuator drive unit 66. The output of the unit 66 is connected to control a throttle 68 of the engine 16.

Transmission Ratio Control Circuit

Finally, a transmission-ratio controller 90 is provided, that includes two closed-loop controllers, a "Utility power normal" controller 80, and a "Utility power failed" controller, 70.

The controller 70 includes a comparator 72, which has inputs 72a and 72b and an output terminal 72c. At input 72a, a signal is connected from a frequency sensor 74, which measures the frequency of electrical power on the power lines 8. Either of two frequency reference signals is connectable to the input terminal 72b, as will be described later. The output terminal 72c is connected to a module 78, which contains prior-art gain and compensation elements for the frequency-control loop of which controller 70 is a part.

The frequency reference signal at terminal 72b is received from an output terminal 75c of a selector device 75, shown as a relay. This reference-selection circuit is used to bring the dynamo 10 to the frequency of the utility power lines 4 during restoration of utility power, as described later.

A reference module 76 for the frequency controller 70 is connected to one selectable terminal 75a of the relay 75. A line-frequency sensor 79 senses the frequency of the utility power lines 4 and provides a signal indicative of that frequency to the other selectable terminal 75b of the selector relay 75.

The actuator of the selector device 75 (which in FIG. 1 is a relay coil), is connected at a terminal 75d. It is energized by the output of a time-delay device 77, which receives its input signal from the line-condition sensor 38.

The "Utility power normal" controller 80 includes a comparator 82, which has inputs 82a and 82b and an output terminal 82c. At input 82a, a signal is connected from the flywheel tachometer 39. A flywheel "cruising" speed reference module 86 is connected to input terminal 82b. Output terminal 82c is connected to a module 88, which contains prior-art gain and compensation elements for the flywheel-speed loop of which controller 80 is a part.

A loop-selector function switch 92 receives output signals from blocks 78 and 88, that is, from controllers 70 and 80. The function switch 92 acts a selector switch. Function switch 92 is actuated, via the time-delay device 40, by the line-condition sensor 38. The loop-selector function switch 92 selects the output of the normal-utility controller 80 when the utility power is normal, and selects the output of the failed-utility controller 70 when the utility power has failed. The output of the function switch 92 is connected to an actuator 94, which controls the position of the swash plate 110 of the hydraulic device 30.

The swash plate 110 controls the displacement, or amount of fluid transferred upon each rotation of the device 30, and consequently controls the transmission ratio between the flywheel shaft 24 and the dynamo shaft 12.

Operation of the Preferred Embodiment

The operation of the preferred embodiment, including time sequences of operation under several conditions, is described immediately below.

A. Operation with Normal Utility Power Conditions

Initially the voltage of the utility power line 4 is normal, the engine 16 is not running, the clutch 14 is disengaged, the disconnect mechanism 7 is engaged to conduct power, and the loop selector mechanism function switch 92 is in the flywheel-speed-control position that utilizes controller 80. The dynamo 10 is operating as a motor, driven by the utility power line to supply friction losses to the flywheel 22 and other losses. The flywheel is spinning at a predetermined cruising speed under control of the closed loop 80, and the transmission 26 is transmitting enough power from the dynamo 10 to the flywheel to keep it up to that cruising speed.

Because conditions are normal at the utility AC power source 2 and the electrical power lines 4, the dynamo 10 is importing a relatively small amount of power from the lines 4, and the sensor 38 senses and indicates that the utility line conditions are normal. Although the tachometer 54 is producing zero speed signal and the speed reference module 56 is producing a reference voltage, the clutch actuator 58 does not engage the clutch 14 because the actuator 58 is under the overriding control of the normal-line-condition signal at terminal 58b, which indicates that the utility power source is operating properly.

B. Operation Immediately After Failure of Normal Utility Power and Before Start of the Emergency Engine When the utility power source 2 falters or fails, the line power condition sensor 38 senses the change, and issues an alarm signal that starts the time-delay device 40, which, after a small delay, activates interruption-device 7 to disengage the load and dynamo from the failed utility, and switches the hydraulic transmission function switch 92 from flywheel-speed control to dynamo-frequency control, which uses controller 70.

For outages of the utility power that last only a few seconds there is enough energy in the flywheel 22 to supply power to the load without starting the engine 16. The flywheel provides a "ride-through" capability for such brief outages, and the engine 16 may not yet be up to speed, or even started, by the time the normal power is restored.

The clutch 16 remains open despite an enabling signal from the sensor 38 to terminal 58b of the clutch actuator 58, because the engine is not running, as ascertained by the engine tachometer 54. The zero signal from tachometer 54 prevents the comparator 52 from sending a clutch engagement command to terminal 58a of the clutch actuator 58.

The flywheel 22 supplies power through the transmission 26 to the dynamo 10 to power the electrical load 6. The relay 75 is in position 75a, which connects the reference device 76. When the line frequency sensor 74 senses an instantaneous frequency that is less that the reference frequency 76, the controller 70 sends an error signal through function switch 92 to the swash plate actuator 94, which moves the swash plate 110 to increase the transmission's speed ratio. Power that is withdrawn from the flywheel through the transmission 26 accelerates the dynamo 10, to correct the low-frequency problem.

Conversely, if the flywheel is instantaneously supplying too much power, the frequency of the dynamo's output increases and the swash plate 110 is moved so as to transmit power at a lower rate.

Thus, although the flywheel progressively slows down because of providing its energy through the transmission to the dynamo 10, the dynamo's electrical output is kept up to a rated frequency, because the position of the swash plate 110 is continuously automatically adjusted.

If the utility line power is restored to normal before the flywheel speed has diminished to a predetermined intermediate-speed threshold, the engine 16 is not started, but if the outage continues until the flywheel speed has diminished to that threshold, the engine 16 is started.

The intermediate-speed threshold, which is set by reference module 46 in controller 36, is predetermined at a value that delays the start of the engine for a time after utility failure, to avoid starting the engine if the outage is so brief that the flywheel can handle it alone. But the reference module 46 has a high enough value to allow the engine enough time to start and get up to rated speed before the flywheel slows down to its minimum operating limit in case the utility line failure lasts that long.

C. Operation After Engine Has Started And Before Clutch is Engaged

The energy stored in the flywheel is proportional to the square of the speed of the flywheel. Whenever the flywheel's speed drops below a predetermined intermediate-speed threshold set by reference module 46, the engine 16 is automatically started and brought up to rated speed.

To engage the clutch 14 at the right time, the engine tachometer 54 transmits a speed signal to the comparator 52, which compares it with the reference 56 (or, alternatively, with a dynamo-frequency signal from the frequency sensor 74). When the engine speed is high enough properly to connect the engine to the dynamo 10, the comparator 52 issues a signal to the clutch actuator 58, which engages the clutch 14, provided that the actuator 58 is enabled by an abnormal-condition signal at its terminal 58b, from the line-power-condition sensor 38. Thereafter the clutch 14 is engaged and power is provided by the dynamo 10 to the electrical load 6 for as long a time as desired.

D. Operation After Clutch is Engaged and Before Restoration of Utility Line Power Upon engagement of the clutch 14, the engine 16 starts driving the dynamo 10, which supplies power to the electrical load 6. If the power supplied to the dynamo by the engine is more than that being demanded by the load, the excess power brings the flywheel back up to its cruising speed, by supplying power through the clutch 14, the shaft 12, and the transmission 26 to the flywheel 22.

Whenever the electrical load 6 on the lines 9 and 8 increases, the frequency of the dynamo 10 diminishes slightly. The frequency sensor 74 therefore reduces the signal it is sending to the comparator 72, which the comparator 72 compares with the reference quantity it receives from the reference device 76. The comparator 72 outputs an error signal at terminal 72c to change the setting of the swash plate 110, to reduce the recovery power being sent to the flywheel or to withdraw energy from the flywheel. The flywheel then draws less recovery power, or transfers more power to the dynamo 10, and the flywheel's speed decreases as a result.

The resulting reduction of flywheel speed is detected by the tachometer 39 and consequently by the engine speed controller 60. The comparator 62 produces an error signal that goes to the actuator 66, which increases the setting of throttle 68 of the engine 16, causinng the engine to increase its power output. As a result, the engine provides more torque to the shaft 12 of the dynamo 10, and the sensor 74 sees an increase of frequency, thereby closing the loop to the transmission 26 and reducing the extraction of energy from the flywheel 22 or increasing the speed-restoring power flowing from the dynamo 10 to the flywheel.

Because both the engine 16 and the hydraulic transmission 26 are coupled to the shaft 12 of the dynamo 10, their torques are algebraically summed on that shaft. While the engine 16 is up to rated speed with the clutch 14 engaged, the engine and the hydraulic transmission 26 are effectively in parallel for purposes of exchanging torque with the dynamo 10 and with each other.

Whenever the dynamo 10 receives excessive torque from either the engine 16 or the flywheel 22, as might occur when the electrical load 6 diminishes, the dynamo 10 starts to generate a frequency that is slightly too high. The frequency sensor 74 and controller 70 recognize the frequency error, and the transmission 26 of the hydraulic loop promptly changes its ratio in a direction to reduce the torque supplied by the flywheel 22, or to send more power from the dynamo shaft 12 to the flywheel, so that excess torque at the dynamo's shaft is used to accelerate the flywheel.

The flywheel tachometer 39, which is in the engine's speed-control loop, then senses an increase in flywheel speed, and the power output of the engine is subsequently reduced by the second controller 60.

When the flywheel is running below its nominal rated cruising speed, energy flows into the flywheel, so that it is "recharged" to a desired nominal cruising speed, which is a predetermined set-point. When load demand becomes low the flywheel recharges very quickly. When the flywheel has accelerated to its predetermined nominal cruising speed the engine is automatically commanded to decrease its power output by the flywheel tachometer 39 and its associated engine controller 60.

During a power-line outage whose duration is long enough for the engine to start driving the load 6, the speed of the dynamo is controlled very closely because there is a torque summation on its shaft. Whenever the speed of the flywheel gets below a predetermined speed, the engine accelerates and supplies more torque, regardless of whether it is the load or the flywheel that is demanding it. Any torque in excess of the load's demand is available to bring the flywheel back up to its cruising speed.

E. Operation During and After Restoration of Normal Utility Power

When normal utility power is restored to the lines 4, the line power condition sensor 38 senses the restoration, and starts the time delay device 77. After the time delay device 77 times out, it actuates the relay 75. Thereupon, the relay 75 disconnects the reference 76 from the frequency control loop 70, and connects in its place a signal from the line-frequency sensor 79. This forces the dynamo 10 to come to a frequency equal to that of the revived utility power lines 4. (Alternatively, the loop 70 could be configured to provide a phase lock with the revived utility power lines 4).

After sufficient time has elapsed to achieve frequency (or phase) lock, the sensor 38, acting through the time delay device 40, commands the interruption device 7 to close, reconnecting utility power 2 to the load 6.

The restoration-indicating signal from the time-delay device 40 performs other functions also. It causes the clutch actuator 58 to disengage the clutch 14, irrespective of the engine's speed; it turns off the engine's ignition circuit 51; and it switches the selector function switch 92 to cause the controller 90 to revert to flywheel-speed control, which uses the controller 80. The time delay 40 has a very short actuation time, and a predetermined longer deactuation time.

With the utility line power 2 back on, the dynamo 10 draws power from the power lines 4, 8, and again operates as a lightly-loaded motor. The dynamo provides torque to the flywheel 22 through the hydraulic transmission 26 to bring the flywheel up to its cruising speed and keep it there. Torque in the transmission is usually in the direction in which the flywheel draws power from the dynamo 10. The hydraulic transmission can transpose the roles of its devices 30 and 34 so that both can serve as either a pump or a motor.

F. Summary of Operation

Two principal closed loops are provided, which act simultaneously, one being relatively fast and the other slower. The hydraulic transmission 26 is in the faster loop (70), which is continuously active whether the utility power source 2 is normal or not. The engine 16 is in the slower control loop (60); the slower loop is used to bring the engine up to power in an emergency and to regulate the engine's output torque. The loops interact with each other because of their common connections.

The fast loop, which controls the speed ratio of the hydraulic transmission 26, provides rapid wideband control. This loop senses the dynamo's electrical frequency and also its phase if desired, and has relatively high gain. Energy can be drawn from and returned to the flywheel very quickly through the gear box and hydraulic transmission 26. The hydraulic loop gives the system a dynamic capability that comes into play to provide torque when the load is changing rapidly, and under certain other conditions.

When the utility power has failed, the variable transmission 26 ordinarily controls the torque provided by the flywheel to the dynamo, and at other times it ordinarily controls the torque provided in the opposite direction, that is by the dynamo to the flywheel.

In the slower loop the engine is controlled in response to the speed sensor 39 on the flywheel. In the example being described the engine has a turbocharger, which has slow response to the speed-error signal at 62c of the slower loop. Nevertheless, when the frequency of the dynamo's output must be corrected, the effects of the turbocharger's lag are almost imperceptible at the dynamo's electrical output lines 8, because of quick compensating action by the fast hydraulic loop 70, etc.

The system performs several functions. It charges the flywheel automatically. It provides uninterrupted power for the load without starting the engine 16 during brief power outages lasting up to perhaps five seconds. If the utility power is not restored by then, the flywheel provides uninterrupted power throughout a further period (e.g., four more seconds) until the engine can be started, brought up to speed, and connected to the dynamo to drive the electrical load. Thereafter, the engine provides power to the load for as long as desired.

As set out in the claims to the invention, the invented system controls the frequency of the emergency dynamo 10 by sensing the flywheel speed to control the engine 16 for the remainder of a line outage. After restoration of normal utility power the clutch 14 is disengaged and the engine is shut down.

Although the invention has been described by means of a preferred embodiment, numerous other embodiments are possible. The scope of the invention is defined by the claims.

I claim:

1. A system for providing power to an electrical load when a usual source of power for the load has failed, comprising:

an electrical dynamo (10) connected with said load;

an engine (16) of controllable speed connected for mechanically driving, with a fixed speed ratio, said dynamo;

energy storage means (22) for providing energy when said usual source of power has failed;

a first sensor (39) connected with said energy storage means for sensing a quantity dependent upon the energy stored in said energy storage means and providing a first signal indicative of said quantity;

a first controller (60) responsive to at least said first signal and having an output connected with said engine for controlling the torque of said engine;

transmission means (26) having a variable transmission ratio between its two ends, drivably connected between said energy storage means at one end and said dynamo at the other end;

said transmission means being drivably intermediate said flywheel and said engine so that said flywheel is separated from said engine by at least said transmission means;

said transmission means including transmission control means (110) for controlling said variable transmission ratio;

a second sensor (74) connected with said dynamo for sensing the frequency of said dynamo and providing a second signal dependent upon said frequency;

a second controller (70) connected with said transmission control means (110) and connected to receive and respond to at least said second signal for controlling said transmission ratio of said transmission means to produce a predetermined reference speed at the end of said transmission nearer to which said dynamo is connected;

whereby said dynamo (10) is drivably connected simultaneously with both said engine (16) and said transmission (26), and the torque of said engine is controlled by said first signal indicative of said quantity dependent upon the energy stored in said energy storage means (22).

2. A system as in claim 1 and wherein said energy storage means (22) comprises flywheel means for storing kinetic energy of rotation.

3. A system as in claim 2 and wherein said quantity indicative of the energy stored in said energy storage means comprises the speed of said flywheel, and said first sensor (39) comprises means for sensing the speed of said flywheel.

4. A system as in claim 1 and wherein said transmission means (26) comprises hydraulic pump means for converting mechanical power to hydraulic power and hydraulic motor means hydraulically connected with said hydraulic pump means to receive said hydraulic power for converting said hydraulic power to mechanical power.

5. A controller for a system for providing power to an electrical load when a usual source of power for the load has failed, said system including an electrical dynamo (10) connected with said load; an engine (16) of controllable torque connected with a fixed speed ratio for mechanically driving said dynamo; flywheel means (22) for providing energy when said usual source of power has failed; and transmission means (26) having a variable transmission ratio, drivably connected between said flywheel and said dynamo, said transmission means being drivably intermediate said flywheel and said engine so that said flywheel is separated from said engine by at least said transmission means;

said transmission means including transmission control means (110) for controlling said system; comprising:

a first sensor (39) connected with said flywheel means for sensing the speed of said flywheel means and providing a first signal indicative of said speed;

a first controller (60) responsive to at least said first signal and having an output connected for controlling the torque of said engine;

a second sensor (74) connected with said dynamo (10) for sensing the frequency of said dynamo and providing a second signal dependent upon said frequency;

a second controller (70) connected with said transmission control means (110) and connected to receive and respond to at least said second signal for controlling said transmission ratio of said transmission means (26) to produce, at the end of said transmission nearer to which said dynamo is connected, a speed set by a predetermined reference module (76);

whereby said dynamo (10) is drivably connected simultaneously with both said engine (16) and said transmission (26), and the torque of said engine is controlled by said first signal indicative of the speed of said flywheel means (22).

6. A system for providing power from an energy storage source (22) to an electrical load (6) when a usual source of power (2) for the load has failed, said energy storage source having provision for automatically being kept charged with energy, comprising:

an electrical dynamo (10) connected electrically with said load;

energy storage means (22) for receiving energy to maintain a predetermined level of stored energy when said usual source of power has not failed, and for providing energy to said load temporarily when said usual source of power has failed;

a sensor (39) connected with said energy storage means (22) for sensing a quantity dependent upon the energy stored in said energy storage means and providing a first signal indicative of said quantity;

transmission means (26) having a variable transmission ratio between its two ends, drivably connected between said dynamo at one of its ends and said energy storage means at the other of its ends, the transmission ratio of said transmission means being controllable in response to a ratio-control signal at a ratio-control input (110);

a normal-condition controller (80) for providing a normal-condition ratio-control signal, for controlling the energy stored in said energy storage means (22) to a predetermined level by controlling energy flow between said dynamo (10) and said energy storage means (22), in response to said first signal;

a failed-condition controller (70) for providing a failed-condition ratio-control signal, for exchanging energy between said energy storage means (22) and said dynamo (10) in response to said second signal;

sensing means (38) for sensing whether said usual source (2) is in normal condition or failed condition and providing a change-over signal accordingly;

change-over means responsive to said change-over signal for switching the ratio-control input of said transmission means from said normal-condition ratio-control signal to said failed-condition ratio-control signal upon a change of condition of said usual source (2) from a normal condition to a failed condition.

7. A system as in claim 6 and wherein:

said normal-condition controller (80) comprises:

(a) a normal-condition reference means (86) for providing a predetermined normal-condition reference signal;

(b) a normal-condition comparator (82) having a first input (82*a*) connected to receive and respond to said first signal, a second input (82*b*) connected to receive said normal-condition reference signal, and an output (82*c*) connected for providing said normal-condition ratio-control signal to said transmission control means (110) during normal conditions of said usual utility source; and, said failed-condition controller (70) comprises:

(a) a failed-condition reference means (76) for providing a predetermined failed-condition reference signal;

(b) a failed-condition comparator (72) having a first input (72*a*) connected to receive and respond to said second signal, a second input (72*b*) connected to receive said failed-condition reference signal, and an output (72*c*) connected for providing said failed-condition ratio-control signal to said transmission control means (110) during failed conditions of said usual utility source.

8. A system as in claim 6 and wherein said energy storage means (22) comprises flywheel means for storing kinetic energy of rotation.

9. A system as in claim 6 and wherein said transmission means (26) comprises hydraulic pump means for converting mechanical power to hydraulic power and hydraulic motor means hydraulically connected with said hydraulic pump means to receive said hydraulic power for converting said hydraulic power to mechanical power, and said transmission control means comprises swash plate means (110) for controlling fluid displacement of at least one of said hydraulic pump means and said hydraulic motor means.

* * * * *